US012325118B2

(12) United States Patent
Samstag et al.

(10) Patent No.: US 12,325,118 B2
(45) Date of Patent: Jun. 10, 2025

(54) ROTARY IMPACT TOOL

(71) Applicant: TECHTRONIC CORDLESS GP, Anderson, SC (US)

(72) Inventors: Matthew Samstag, Anderson, SC (US); Julia H. Moylan, Easley, SC (US)

(73) Assignee: Techtronic Cordless GP, Anderson, SC (US)

( * ) Notice: Subject to any disclaimer, the term of this patent is extended or adjusted under 35 U.S.C. 154(b) by 26 days.

(21) Appl. No.: 17/556,460

(22) Filed: Dec. 20, 2021

(65) Prior Publication Data

US 2022/0193877 A1 Jun. 23, 2022

Related U.S. Application Data

(60) Provisional application No. 63/128,307, filed on Dec. 21, 2020.

(51) Int. Cl.
*B25F 5/00* (2006.01)
*B25B 21/02* (2006.01)
*B25F 5/02* (2006.01)

(52) U.S. Cl.
CPC ................ *B25F 5/001* (2013.01); *B25F 5/02* (2013.01); *B25B 21/02* (2013.01)

(58) Field of Classification Search
CPC ......... B25B 23/0007; B25F 5/001; B25F 5/02
See application file for complete search history.

(56) References Cited

U.S. PATENT DOCUMENTS 5,269,733 A 12/1993 Anthony, III
6,286,610 B1 9/2001 Berger et al.
6,431,289 B1 8/2002 Potter et al.
6,488,286 B2 12/2002 Yaksich
6,729,812 B2 5/2004 Yaksich et al.
6,984,188 B2 1/2006 Potter et al.
7,008,151 B2 3/2006 Yaksich et al.
7,048,075 B2 5/2006 Saito et al.
7,455,121 B2 11/2008 Saito et al.
7,455,615 B2 11/2008 Chen
7,735,575 B2 6/2010 Trautner
7,980,324 B2 7/2011 Bixler et al.

(Continued)

FOREIGN PATENT DOCUMENTS

CN 202137743 U 2/2012
CN 205715474 U 11/2016

(Continued)

OTHER PUBLICATIONS

Extended European Search Report for Application No. 21215167.4 dated Aug. 22, 2022 (11 pages).

*Primary Examiner* — Daniel Jeremy Leeds

(74) *Attorney, Agent, or Firm* — Michael Best & Friedrich LLP

(57) ABSTRACT

A power tool includes an outer housing, a drive mechanism positioned within the outer housing, a gear case positioned within the outer housing, a gear assembly positioned within the gear case, and an output mechanism configured to receive torque from the drive mechanism via the gear assembly to rotate about a rotational axis. The outer housing includes a rib extending from an inner surface of the outer housing, and the rib is received in an aperture of the gear case to rotationally fix the gear case to the outer housing.

20 Claims, 12 Drawing Sheets

(56) References Cited

U.S. PATENT DOCUMENTS

| | | | | |
|---|---|---|---|---|
| 8,205,685 | B2 | 6/2012 | Bixler et al. | |
| 8,631,880 | B2 | 1/2014 | Murthy et al. | |
| 8,684,882 | B2 | 4/2014 | Kondo | |
| 8,714,279 | B2 | 5/2014 | Nagasaka et al. | |
| 8,720,598 | B2 | 5/2014 | Herr | |
| 8,757,286 | B2 | 6/2014 | Nagasaka et al. | |
| 8,827,003 | B2 | 9/2014 | Nagasaka et al. | |
| 8,851,201 | B2 | 10/2014 | Limberg et al. | |
| 9,014,933 | B2 | 4/2015 | Chen et al. | |
| 9,212,725 | B2 | 12/2015 | Steckel et al. | |
| 9,415,448 | B2 | 8/2016 | Schenk et al. | |
| 9,481,080 | B2 | 11/2016 | Kuehne | |
| 9,579,785 | B2 | 2/2017 | Bixler et al. | |
| 9,873,191 | B2 | 1/2018 | Herr | |
| 10,137,546 | B2 | 11/2018 | Hecht et al. | |
| 10,357,871 | B2 | 7/2019 | Thorson et al. | |
| 10,464,201 | B2 | 11/2019 | Kuehne | |
| 10,668,614 | B2 * | 6/2020 | Bartoszek | B25F 5/001 |
| 10,746,277 | B2 | 8/2020 | Hecht et al. | |
| 2002/0096342 | A1 * | 7/2002 | Milbourne | B25B 21/00 173/178 |
| 2005/0183870 | A1 * | 8/2005 | Wada | B25B 21/02 173/128 |
| 2007/0201748 | A1 | 8/2007 | Bixler et al. | |
| 2011/0036605 | A1 * | 2/2011 | Leong | B25F 5/001 173/47 |
| 2012/0006573 | A1 | 1/2012 | Sugimoto | |
| 2012/0222879 | A1 | 9/2012 | Bixler et al. | |
| 2012/0318549 | A1 | 12/2012 | Nagasaka et al. | |
| 2013/0072341 | A1 | 3/2013 | Chen | |
| 2014/0091648 | A1 | 4/2014 | Kumagai | |
| 2015/0135872 | A1 | 5/2015 | Wang et al. | |
| 2016/0250742 | A1 | 9/2016 | Kuehne | |
| 2017/0120437 | A1 | 5/2017 | Bixler et al. | |
| 2018/0264637 | A1 | 9/2018 | Kuehne et al. | |
| 2018/0318988 | A1 | 11/2018 | Li | |
| 2019/0283222 | A1 | 9/2019 | Thorson et al. | |
| 2020/0023501 | A1 | 1/2020 | Bandy et al. | |
| 2020/0023505 | A1 | 1/2020 | Kuehne | |
| 2020/0282540 | A1 | 9/2020 | Bartoszek et al. | |

FOREIGN PATENT DOCUMENTS

| | | | |
|---|---|---|---|
| CN | 206200848 | U | 5/2017 |
| CN | 107020604 | A | 8/2017 |
| CN | 207273154 | U | 4/2018 |
| CN | 108071757 | A | 5/2018 |
| CN | 207830479 | U | 9/2018 |
| CN | 108637957 | A | 10/2018 |
| CN | 108972459 | A | 12/2018 |
| CN | 208364712 | U | 1/2019 |
| CN | 209936801 | U | 1/2020 |
| DE | 202012006549 | U1 | 10/2012 |
| DE | 202018106722 | U1 | 12/2018 |
| EP | 1707847 | B1 | 9/2008 |
| EP | 3147078 | A1 | 3/2017 |
| EP | 2724824 | B1 | 8/2017 |
| EP | 3332918 | A1 | 6/2018 |
| WO | 2009006845 | A1 | 1/2009 |
| WO | 2018062609 | A1 | 4/2018 |
| WO | 2019042908 | A1 | 3/2019 |

* cited by examiner

ROTARY IMPACT TOOL

CROSS-REFERENCE TO RELATED APPLICATIONS

This application claims priority to U.S. Provisional Patent Application No. 63/128,307 filed Dec. 21, 2020, the entire contents of which are incorporated herein by reference.

FIELD

The present disclosure relates to power tools, and more particularly to a gear assembly of a power tool.

BACKGROUND

Power tools, such as impact drivers, are capable of delivering rotational impacts to a workpiece at high speeds by storing energy in a rotating mass and transmitting it to an output shaft. Such impact drivers generally have a gear assembly for reducing a rotational speed between an input mechanism (e.g., a motor) and an output mechanism (e.g., a torque impact mechanism).

SUMMARY

The present disclosure provides, in one aspect, a power tool including an outer housing, a drive mechanism positioned within the outer housing, a gear case positioned within the outer housing, a gear assembly positioned within the gear case, and an output mechanism configured to receive torque from the drive mechanism via the gear assembly to rotate about a rotational axis. The outer housing includes a rib extending from an inner surface of the outer housing, and the rib is received in an aperture of the gear case to rotationally fix the gear case to the outer housing.

The present disclosure provides, in another aspect, a power tool including an outer housing, a drive mechanism positioned within the outer housing, a gear assembly positioned within the outer housing, the gear assembly including a ring gear, and an output mechanism configured to receive torque from the drive mechanism via the gear assembly to rotate about a rotational axis. The ring gear is directly supported by the outer housing The present disclosure provides, in another aspect, a power tool including an outer housing including a motor housing portion, a motor positioned within the motor housing portion, the motor including a motor shaft, a motor support member configured to rotatably support the motor shaft, the motor support member including an outer circumferential surface having a groove, a gear assembly positioned within the outer housing and configured to receive torque from the motor, an output mechanism configured to receive torque from the motor via the gear assembly to rotate about a rotational axis, and a sealing member positioned within the groove. The sealing member is configured to form a seal between the outer housing and the motor support member.

Other features and aspects of the disclosure will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
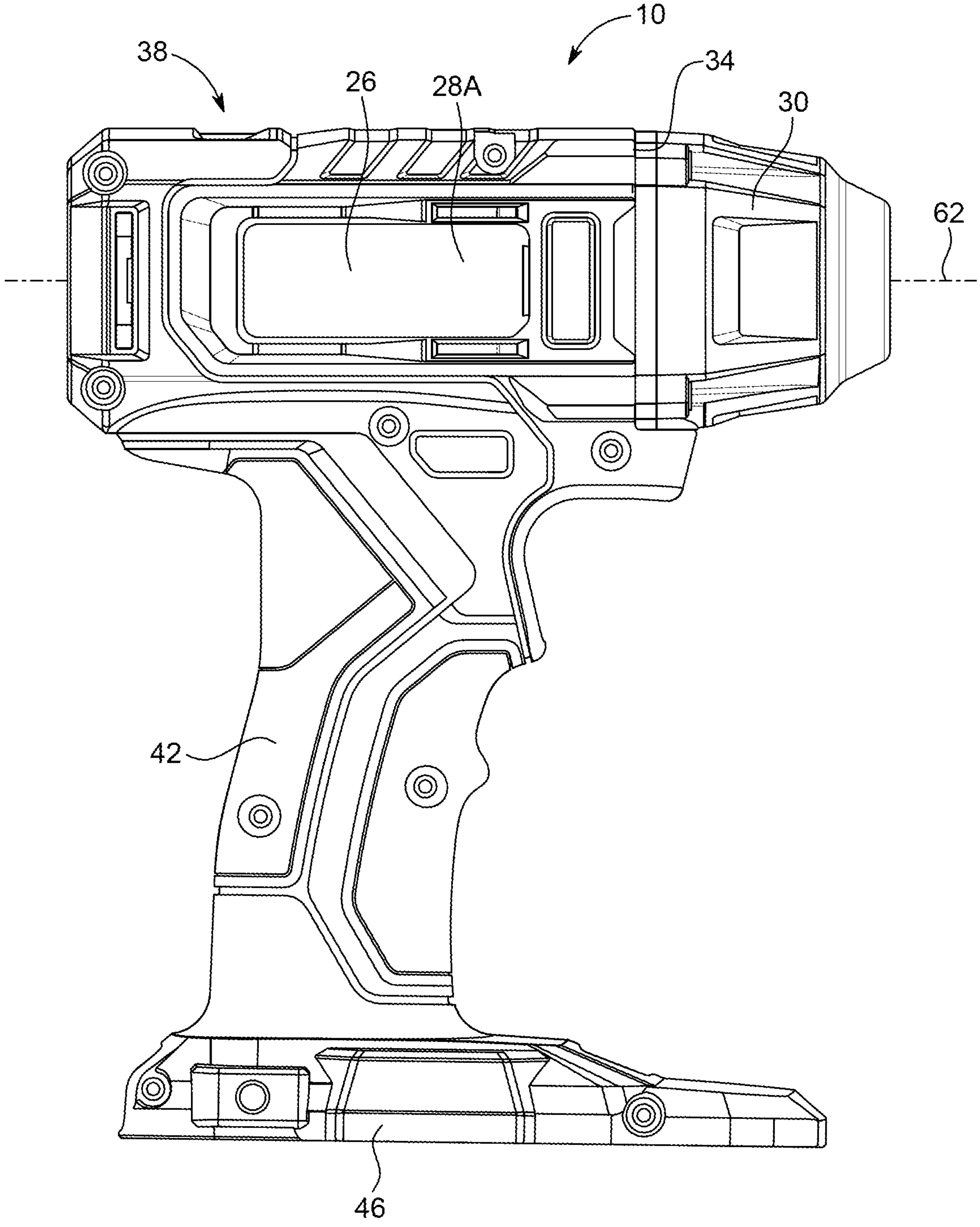
FIG. 1 is a side view of an impact driver in accordance with an embodiment of the disclosure, illustrating an outer housing.

FIG. 1 illustrates a power tool, such as an impact driver 10. The illustrated impact driver 10 includes a planetary gear assembly 14 (FIG. 4) that transmits torque from a drive mechanism, such as an electric motor 18, to an output mechanism, such as a rotary impact mechanism 22. Although the power tool 10 shown and described herein is an impact driver 10, it should be noted that the planetary gear assembly 14 and disclosed retention and housing thereof is equally applicable to other power tools (e.g., drills, impact wrenches, saws, drivers, routers, etc.) that are operable to transfer torque between rotatable input and output components. In other words, persons having skill in the art will recognize that the subject matter disclosed herein is not solely limited to an impact driver, but rather, may be included in any other type of power tool in general, such as any power tool utilizing gears and/or a gear assembly.

Figure 2:
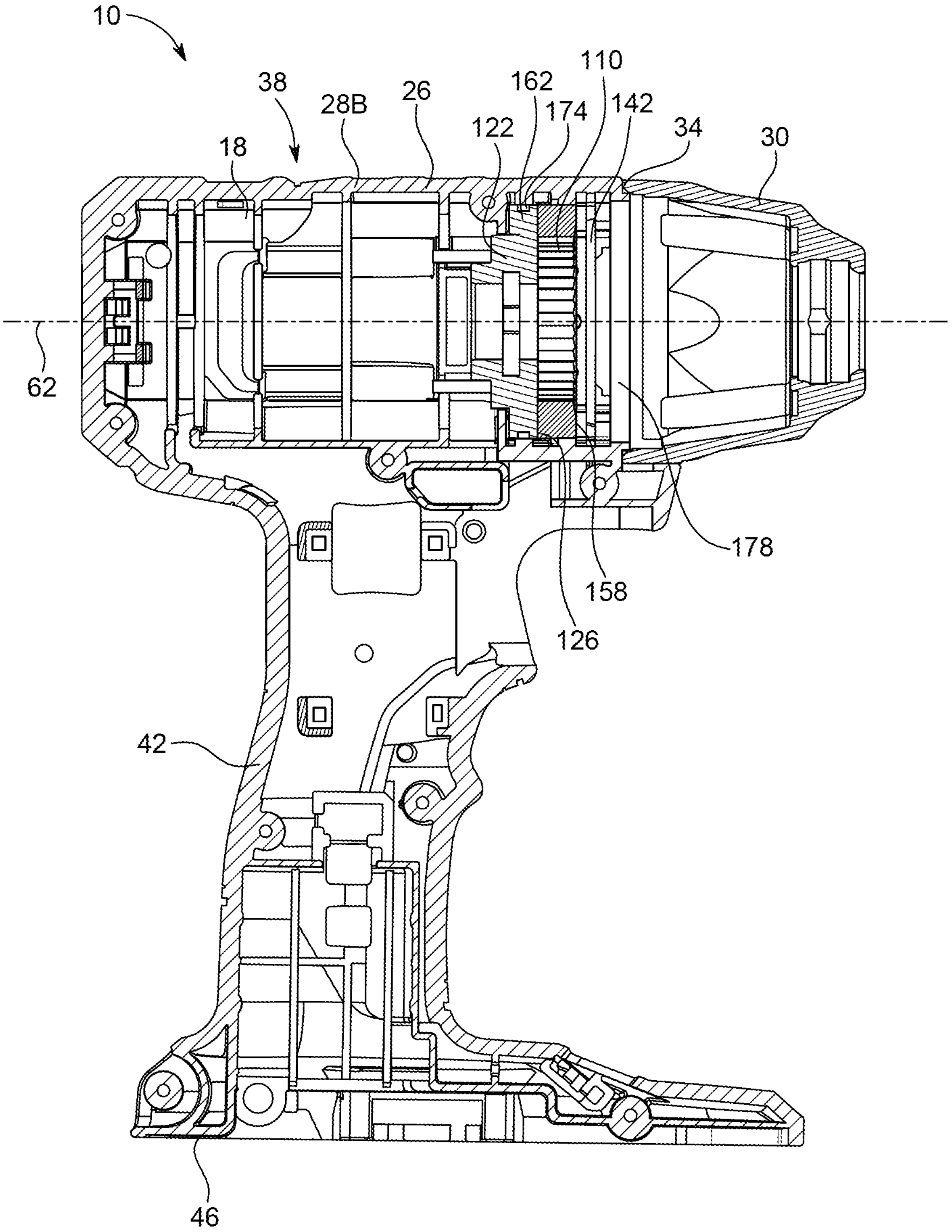
FIG. 2 is a side view of a portion of the impact driver of FIG. 1, with a portion of the outer housing removed and illustrating an inner surface of the outer housing.

With reference to FIGS. 1 and 2, the illustrated impact driver 10 includes an outer housing 26 having two housing shells 28A, 28B and a front housing 30 coupled to an end 34 of a motor housing portion 38 of the outer housing 26. The outer housing 26 may also include a handle portion 42 extending from the motor housing portion 38 and a battery mount portion 46 coupled to an opposite end of the handle portion 42. The battery mount portion 46 is configured to receive a battery pack (not shown), which may then supply electrical power to the motor 18. The battery pack may include any of a number of different nominal voltages (e.g., 12V, 18V, etc.), and may be configured having any of a number of different chemistries (e.g., lithium-ion, nickel-cadmium, etc.). In alternative embodiments, the motor 18 may be powered by a remote power source (e.g., a household electrical outlet) through a power cord.

Figure 3:
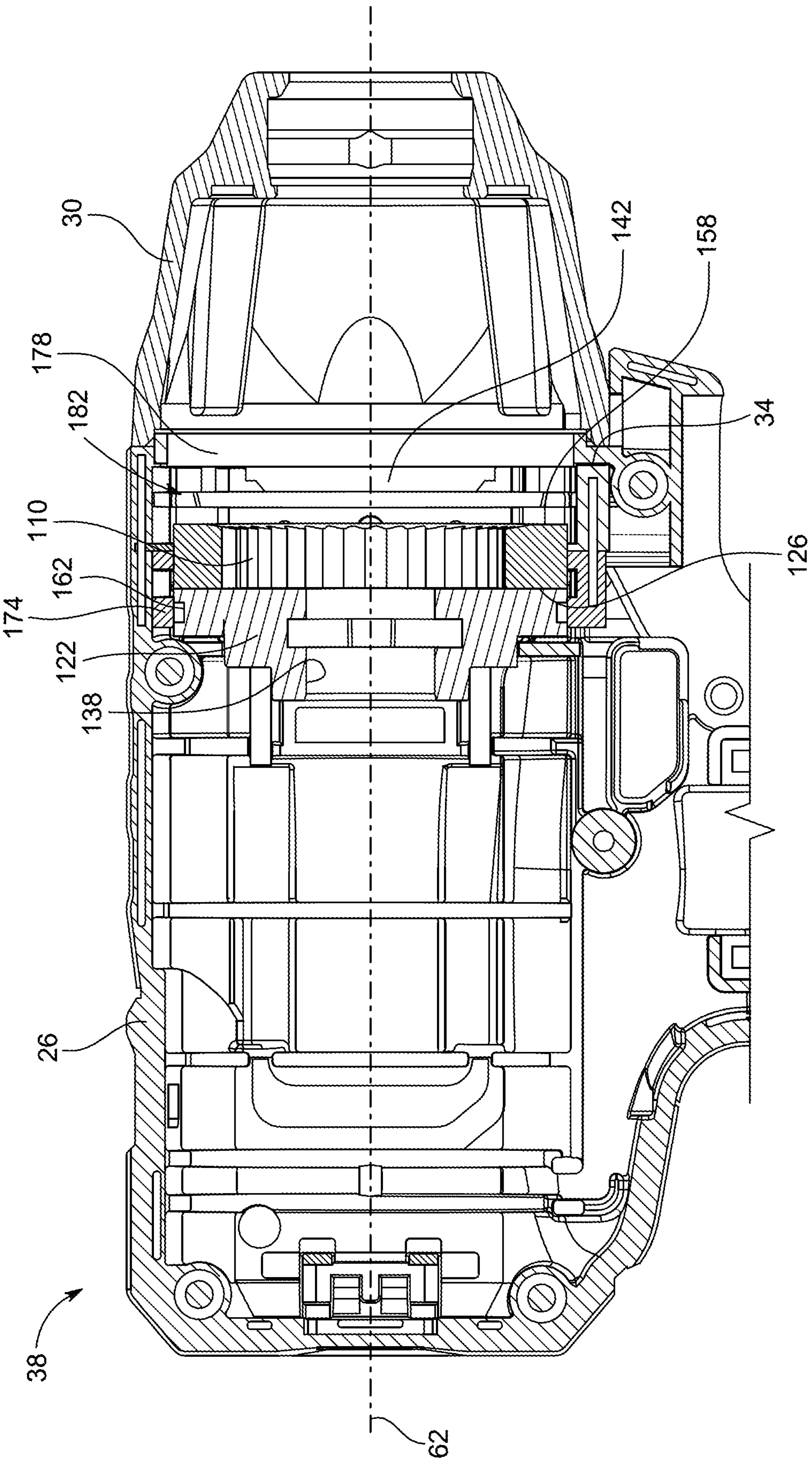
FIG. 3 is an enlarged view of the portion of the impact driver shown in FIG. 2.

With reference to FIGS. 2 and 3, the motor 18 and the planetary gear assembly 14 may be supported within the motor housing portion 38. Portions of the rotary impact mechanism 22 may be supported within the motor housing portion 38 and within the front housing 30.

Figure 4:
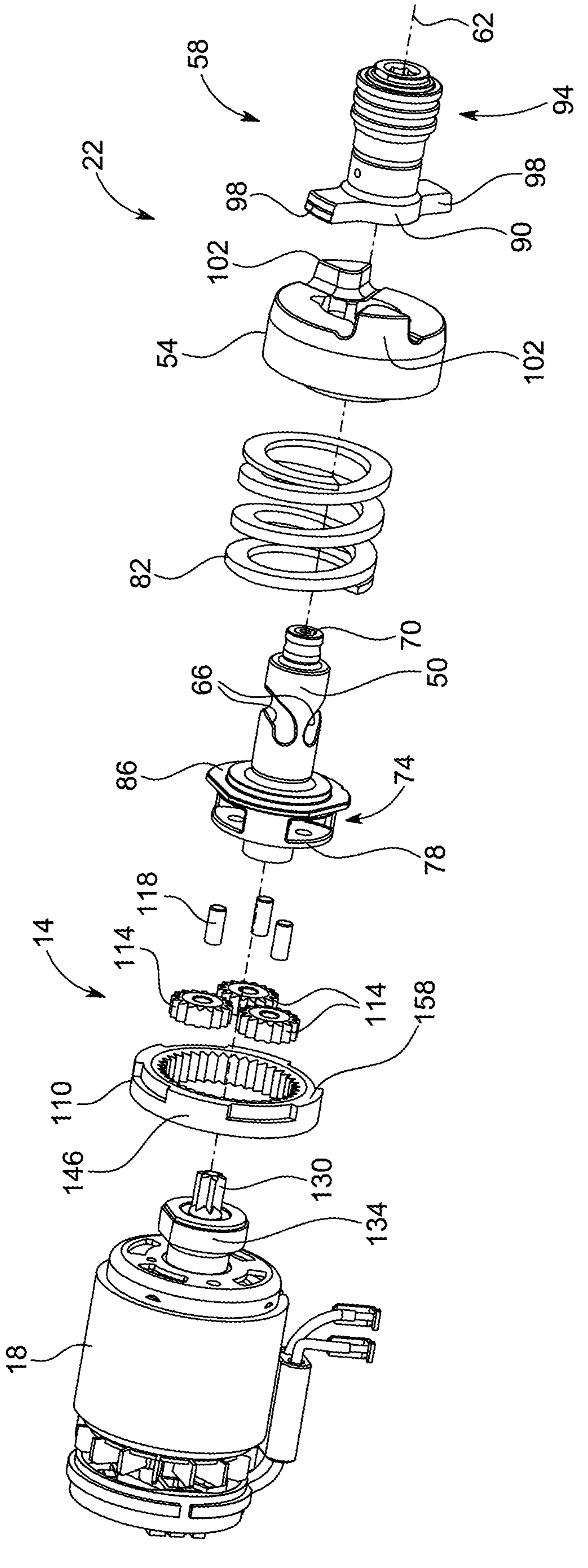
FIG. 4 is an exploded view of a planetary gear assembly and rotary impact mechanism supported by the outer housing of the impact driver of FIG. 1.
Figure 5:
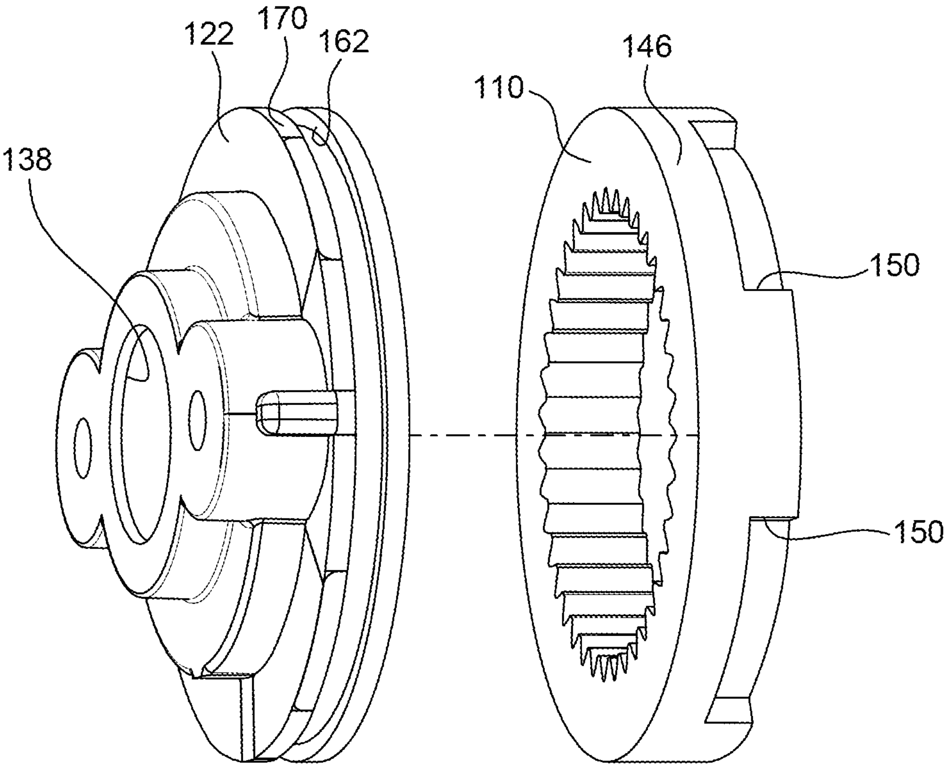
FIG. 5 is a perspective view of a ring gear of the planetary gear assembly of FIG. 4 and a motor support member of the impact driver of FIG. 1.

With reference to FIG. 4, the illustrated rotary impact mechanism 22 includes a cam shaft 50, a hammer 54, and a bit holder assembly 58. The cam shaft 50 is rotatable about a rotational axis 62, which, in the illustrated embodiment, extends through the motor housing portion 38. The illustrated cam shaft 50 includes a plurality of cam grooves 66 positioned proximate a first end 70 of the cam shaft 50. The cam shaft 50 may also include a planet gear carrier portion 74 positioned at a second end 78 of the cam shaft 50 opposite the first end 70. The hammer 54 may be movably coupled to the cam shaft 50 by a plurality of balls (not shown) received within the respective cam grooves 66 of the cam shaft 50 and respective grooves of the hammer 54 (not shown). As such, the hammer 54 may be rotatable by and/or with the cam shaft 50 and axially movable along the cam shaft 50 relative to the rotational axis 62.

In the illustrated embodiment, the rotary impact mechanism 22 further includes a biasing member, such as a compression spring 82, disposed between the hammer 54 and a surface 86 of the planet gear carrier portion 74. The hammer 54 may be biased by the spring 82 toward the bit holder assembly 58 into a first position in which the balls are located proximate the first end 70 of the cam shaft 50 within the cam grooves 66 of the cam shaft 50.

The bit holder assembly 58 may include an anvil 90 and a tool bit chuck 94 configured to selectively retain a tool bit (not shown) thereto. The anvil 90 may include a plurality of arms 98 configured to selectively engage with a plurality of lugs 102 extending from the hammer 54. As such, the anvil 90 may be configured to selectively rotate with the hammer 54 to rotate the bit holder assembly 58 about the rotational axis 62. When torque applied from the impact mechanism 22 to a workpiece exceeds a predetermined limit, the hammer 54 may move axially away from the anvil 90 along the rotational axis 62 against the bias of the spring 82, thereby causing the hammer 54 to disengage the bit holder assembly 58. The spring 82 may then bias the hammer 54 back toward the bit holder assembly 58, and the lugs 102 of the hammer 54 may again engage the arms 98 of the bit holder assembly 58 to impart a rotational impact.

With continued reference to FIG. 4, in the illustrated embodiment, the planetary gear assembly 14 includes a ring gear 110 and one or more planet gears 114 that mesh with the ring gear 110. The planet gears 114 may be rotatably coupled to the planet gear carrier portion 74 of the cam shaft 50 by pins 118. The planetary gear assembly 14 may be directly supported by the outer housing 26, as further discussed below.

With reference to FIGS. 3 and 4, the motor 18 may be supported within the motor housing portion 38 of the outer housing 26 and coupled to a motor support member 122. The motor support member 122 may be directly supported by the first and second housing shells 28A, 28B. As shown in FIG. 3, the motor support member 122 may be positioned adjacent a first side 126 of the ring gear 110. The motor 18 may include a motor shaft having an output gear or pinion 130 (FIG. 4) that meshes with the planet gears 114. When powered, the motor 18 may supply torque to the pinion 130 to rotate the pinion 130 about the rotational axis 62. A radial bearing or bushing 134 may be received within an aperture 138 in the motor support member 122 to rotatably support the pinion 130.

In operation, upon activation of the impact driver 10 (e.g., by depressing a trigger), the battery pack may supply power to the motor 18, causing the pinion 130 to rotate about the rotational axis 62. The pinion 130 may transmit torque to the planet gears 114, causing the planet gears 114 to rotate the cam shaft 50 about the rotational axis 62. As the cam shaft 50 rotates, intermittent applications of torque may be transmitted from the cam shaft 50 to the anvil 90 of the bit holder assembly 58 via rotational impacts delivered by the hammer 54.

With reference to FIGS. 5 and 7-9, the ring gear 110 may be fixedly coupled to an inner surface 142 of the outer housing 26, defined by the connected first and second housing shells 28A, 28B. For example, in the illustrated embodiment, an outer circumferential surface 146 of the ring gear 110 includes a plurality of recesses or slots 150 (FIG. 5), each of which is configured to receive a corresponding rib 154 (FIG. 7) extending radially inward from the inner surface 142 of the outer housing 26. In other words, the inner surface 142 of the outer housing 26 may be complementary in size, shape, etc., to the outer surface 146 of the ring gear 110.

In some embodiments, each recess 150 may be positioned adjacent a second side 158 of the ring gear 110 opposite the first side 126. In addition, the illustrated recesses 150 may be positioned circumferentially equidistantly from one another on the outer circumferential surface 146. The ribs 154 may be coupled directly to the inner surface 142 of the outer housing 26. In the illustrated embodiment, the ribs 154 are integrally formed with the inner surface 142. In other words, the ribs 154 are integrally formed with the housing shells 28A, 28B as a single piece. In other embodiments, the ribs 154 may be separately formed and fixedly coupled to the inner surface 142. Each of the ribs 154 may have a shape complementing a shape of the respective recess 150. In addition, each of the ribs 154 may be elongated in a circumferential direction relative to the rotational axis 62. In this way, the ribs 154 may engage large surface areas of respective recesses 150 for improved retention of the gear ring 110 and gear assembly 14.

Figure 9:
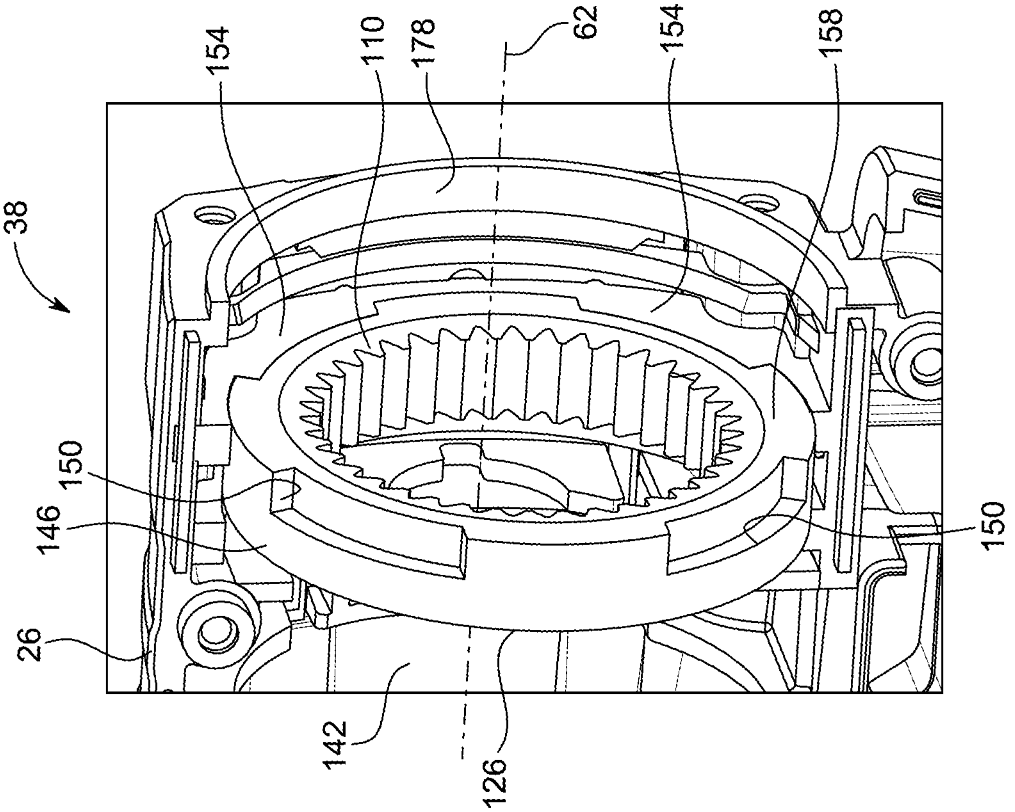
FIG. 9 is another partial view of the impact driver of FIG. 7 illustrating a ring gear of the planetary gear assembly coupled to the ribs.

In the illustrated embodiment, each rib 154 may be received in and engage a respective slot 150 to rotationally fix the ring gear 110 relative to the outer housing 26 (FIG. 9). In other embodiments, the planetary gear assembly 14 may include a multiple stage planetary gear assembly (e.g., a plurality of or multiple planetary stages) in which one, some, or all of the ring gears of the multiple stage planetary gear assembly may include the slots 150 configured to receive the respective ribs 154 of the outer housing 26. In this way, the outer housing 26 of the impact driver 10, by way of the ribs 154, may serve as a gear retaining structure, which obviates the need for a gear box, a gear case, or any such other distinct and separate internal housing to house and/or support the planetary gear assembly 14 within the outer housing 26. In this way, the overall size (e.g., width, diameter, etc.) and/or weight of the power tool may be reduced and be rendered more compact.

Figure 6:
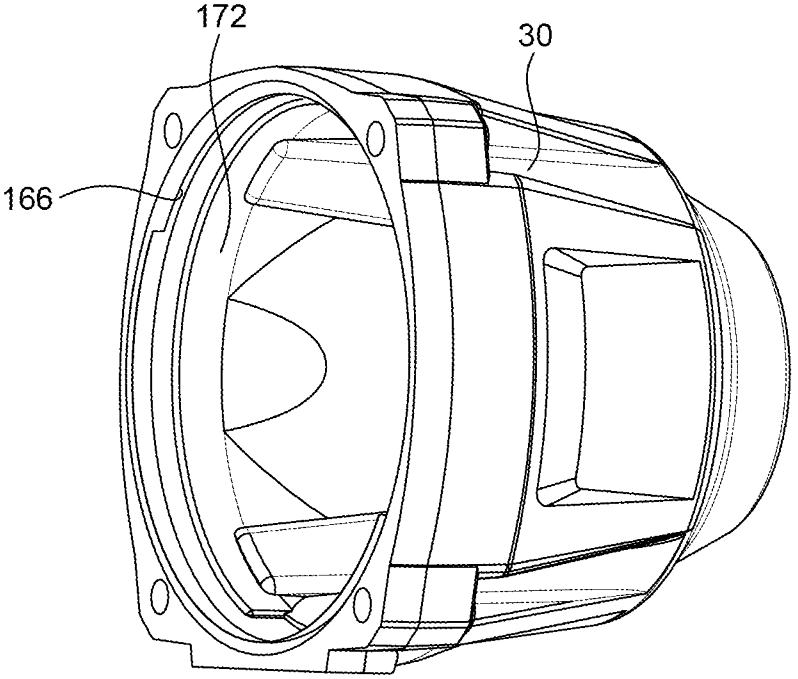
FIG. 6 is a perspective view of a front housing of the impact driver of FIG. 1.

With reference to FIGS. 5-9, the impact driver 10 may also include a plurality of grooves 162, 166, each of which may receive a respective sealing member (e.g., O-ring, not shown). In the illustrated embodiment, an outer circumferential surface 170 of the motor support member 122 may include a first groove 162 (FIG. 5) and an inner surface 172 of the front housing 30 may include a second groove 166 (FIG. 6).

Figure 7:
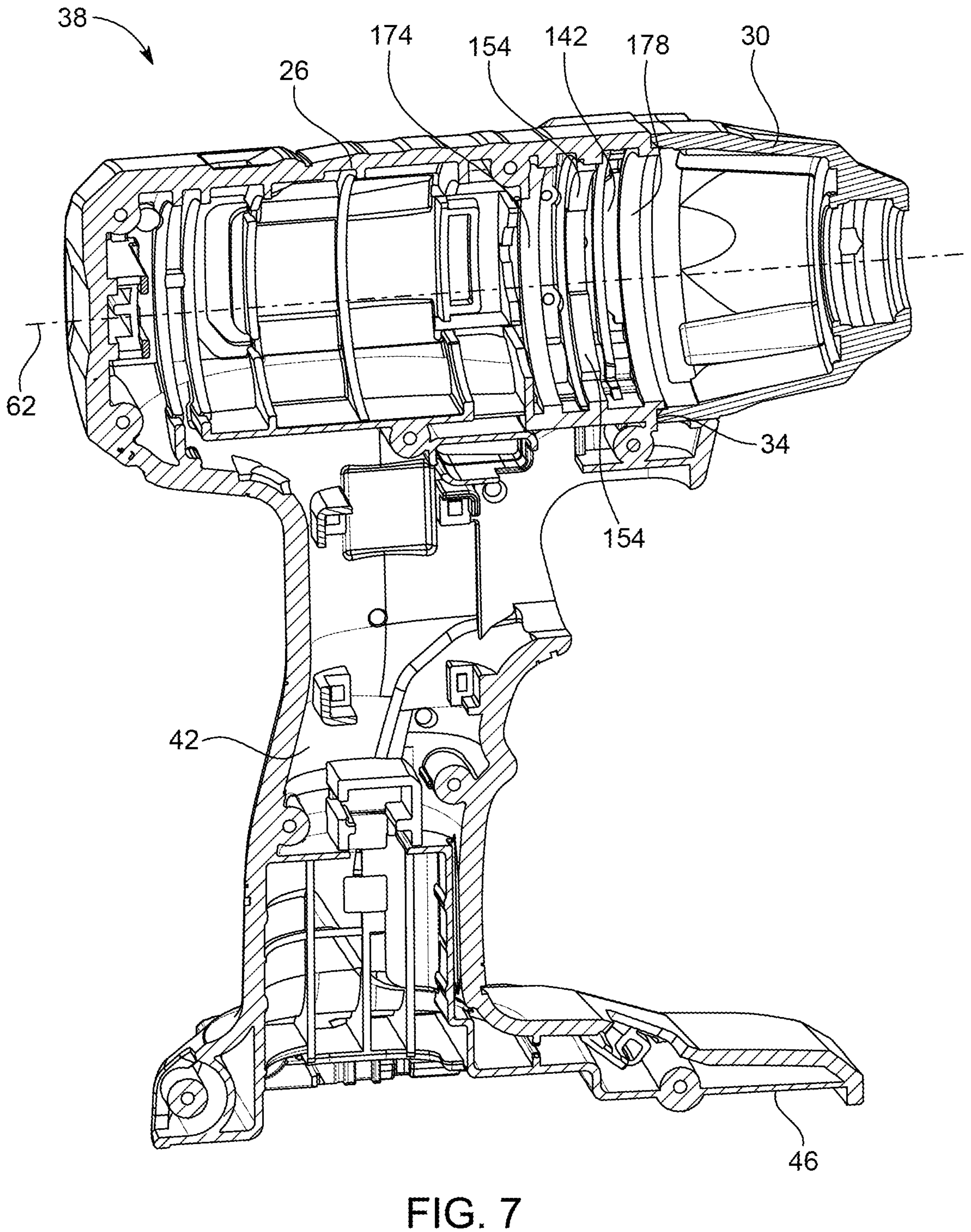
FIG. 7 is a perspective view of the portion of the impact driver of FIG. 2, with the planetary gear assembly removed and illustrating ribs positioned on the inner surface of the outer housing.

As shown in FIGS. 3 and 7, the impact driver 10 may further include a plurality of engagement members 174, 178 for engagement with the respective sealing member when the sealing member is received within the respective first and second grooves 162, 166. For example, the outer housing 26 may include a first engagement member 174 and a second engagement member 178. In the illustrated embodiment, the first and second engagement members 174, 178 are integrally formed with the inner surface 142. In other words, the first and second engagement members 174, 178 are integrally formed with the housing shells 28A, 28B as a single piece. In other embodiments, the first and second engagement members 174, 178 may be separately formed and fixedly coupled to the inner surface 142.

Figure 8:
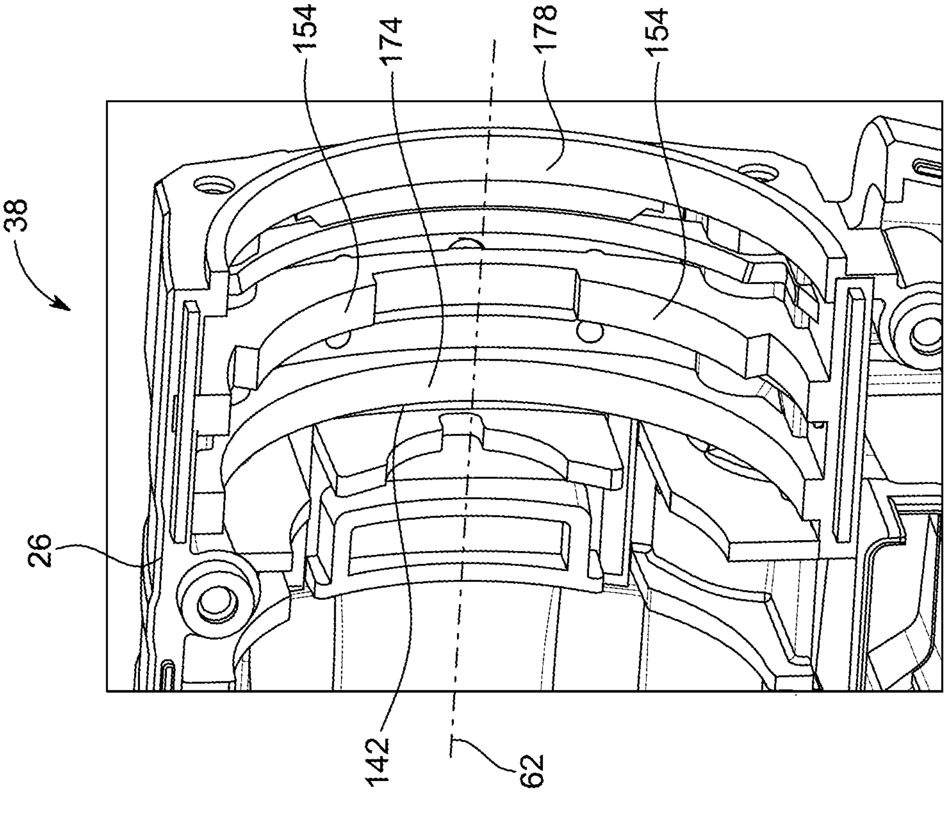
FIG. 8 is a partial view of the portion of the impact driver of FIG. 7.

The first and second engagement members 174, 178 may be positioned on the first and second sides 126, 158, respectively, of the ring gear 110. In addition, the first and second engagement members 174, 178 may be spaced axially away from the ring gear 110 relative to the rotational axis 62. The first engagement member 174 may face the first groove 162 and the second engagement member 178 may extend from the end 34 of the motor housing portion 38 of the outer housing 26 toward the front housing 30 (FIG. 8). The second engagement member 178 may be positioned radially inwardly of the second groove 166 relative to the rotational axis 62 when the impact driver 10 is assembled.

In the illustrated embodiment, each of the first and second engagement members 174, 178 has an annular shape when the housing shells 28A, 28B are coupled together. The first engagement member 174 may engage with the sealing member positioned within the first groove 162 for sealing an interior region 182 of the motor housing portion 38 on one side of the motor support member 122 (e.g., to the right from the frame of reference of FIG. 3). The second engagement member 178 may engage with the sealing member positioned within the second groove 166 for sealing the front housing 30 to the outer housing 26. Accordingly, lubricant for the planetary gear assembly 14 may be sealed within the interior region 182 of the motor housing portion 38 without requiring a separate gear box, case, or other internal housing, configured to house and/or support the planetary gear assembly 14 within the outer housing 26. In this way, the size and/or weight of the power tool may be reduced. In this way, the compact size of the power tool lends such tool to fitting into tighter spaces, while less weight may prevent or reduce operator fatigue.

FIGS. 10-14 illustrate an alternative embodiment of a ring gear 110' of the planetary gear assembly 14 and ribs 154' of the impact driver 10 according to another embodiment of the disclosure, with like components and features as the first embodiment of the ring gear 110 and ribs 154 shown in FIGS. 1-9 being labeled with like reference numerals appended by a prime symbol "'". The ring gear 110' and ribs 154' may be used and incorporated into the impact driver 10 of FIGS. 1-9 and, accordingly, the discussion of the impact driver 10 above equally applies to the ring gear 110' and ribs 154' and is not re-stated. That is, the following description focuses on differences between the ring gear 110 and ribs 154 of FIGS. 1-9 and the ring gear 110' and ribs 154' of FIGS. 10-14.

Figure 11:
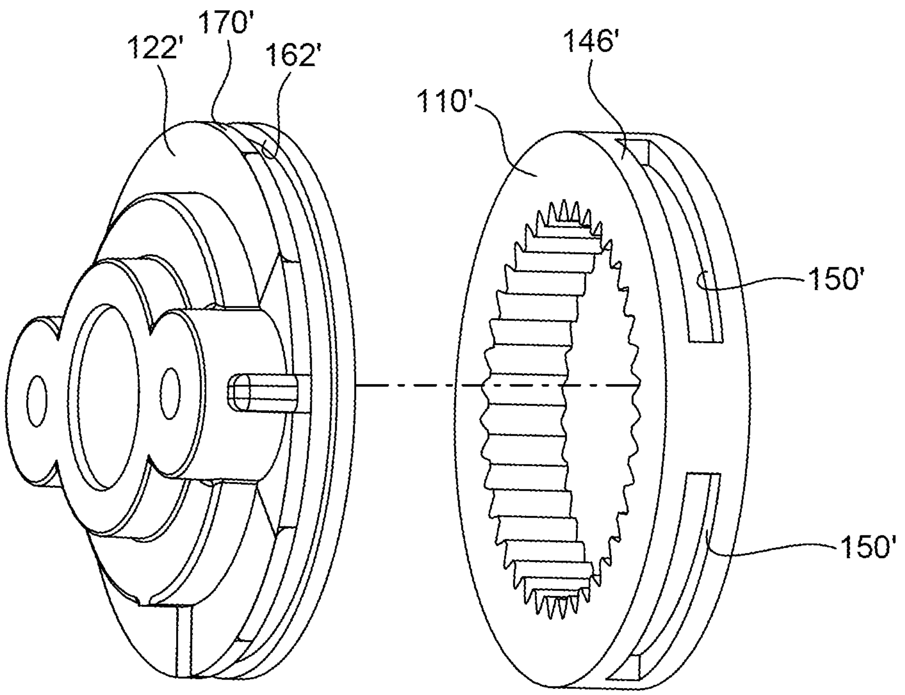
FIG. 11 is a perspective view of a ring gear of the planetary gear assembly of FIG. 10 and a motor support member of the impact driver of FIG. 10.
Figure 12:
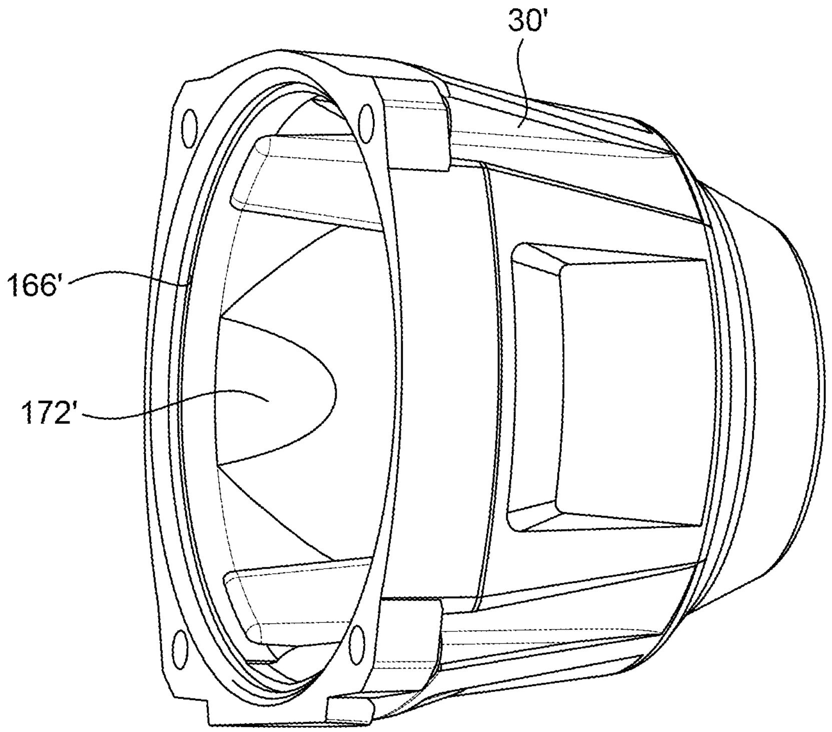
FIG. 12 is a perspective view of a front housing of the outer housing of FIG. 10.
Figure 14:
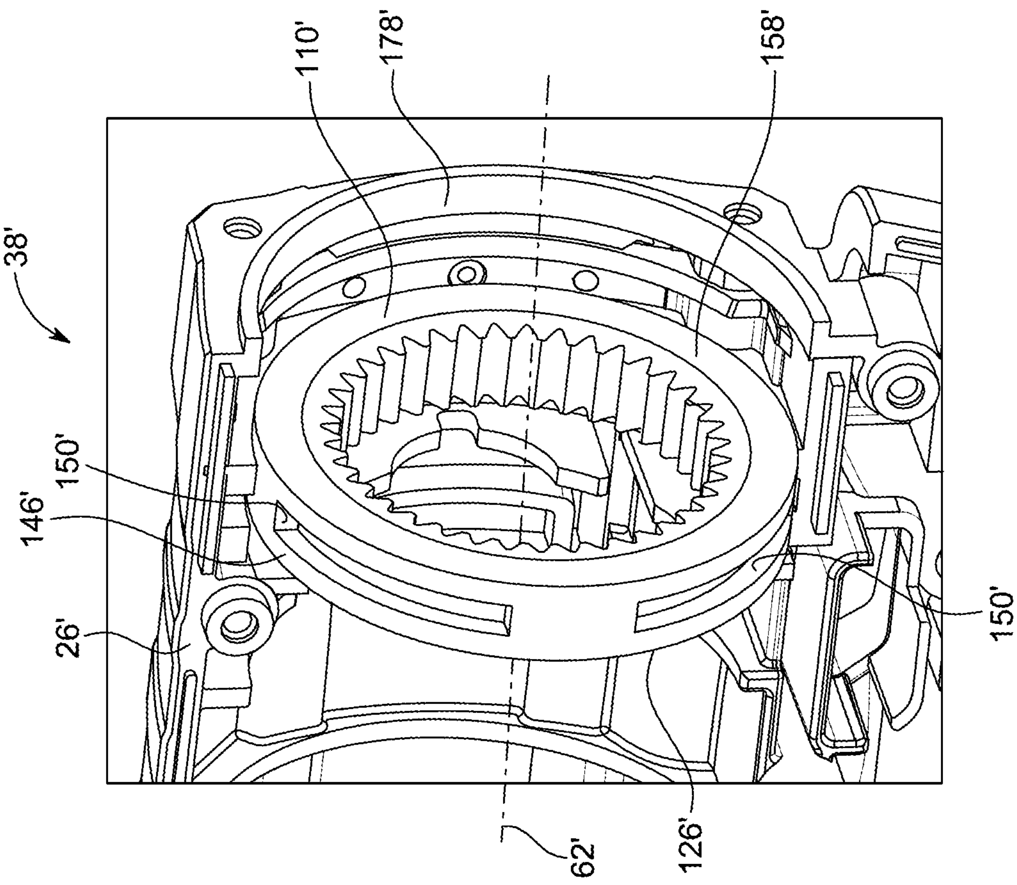
FIG. 14 is a partial view of the impact driver of FIG. 13, illustrating a ring gear of the planetary gear assembly coupled to the ribs.
Figure 13:
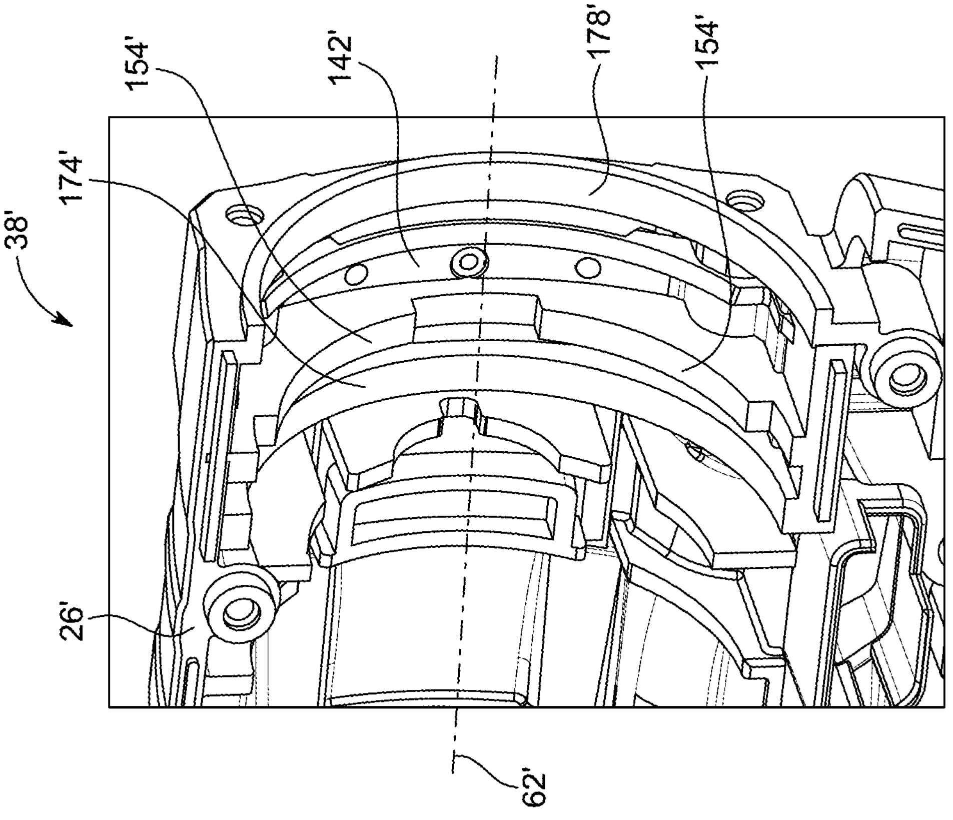
FIG. 13 is a partial view of the impact driver of FIG. 10, illustrating ribs positioned on an inner surface of the outer housing of FIG. 10.

With reference to FIGS. 11 and 14, the illustrated ring gear 110' includes a plurality of recesses 150', each positioned on an outer circumferential surface 146' of the ring gear 110'. Each recess 150' may be spaced equidistantly (or non-equidistantly) from a first side 126' and a second side 158' of the ring gear 110' such that each recess 150' may be centered on the outer circumferential surface 146'. In addition, the illustrated recesses 150' may be positioned circumferentially equidistantly (or non-equidistantly) from one another.

Each recess 150' may receive a corresponding rib 154' (FIG. 13) extending from an inner surface 142' of the outer housing 26'. The ribs 154' may be positioned on the inner surface 142' of the outer housing 26' such that each rib 154' may align with a respective recess 150'. Each of the ribs 154' may have a shape complementing a shape of the respective recess 150'. For example, each of the ribs 154' may have a width that is less than a width of the respective rib 154 of FIG. 8. In addition, each of the ribs 154' may have a circumferential length that is greater than a circumferential length of the respective rib 154 of FIG. 8.

Figure 10:
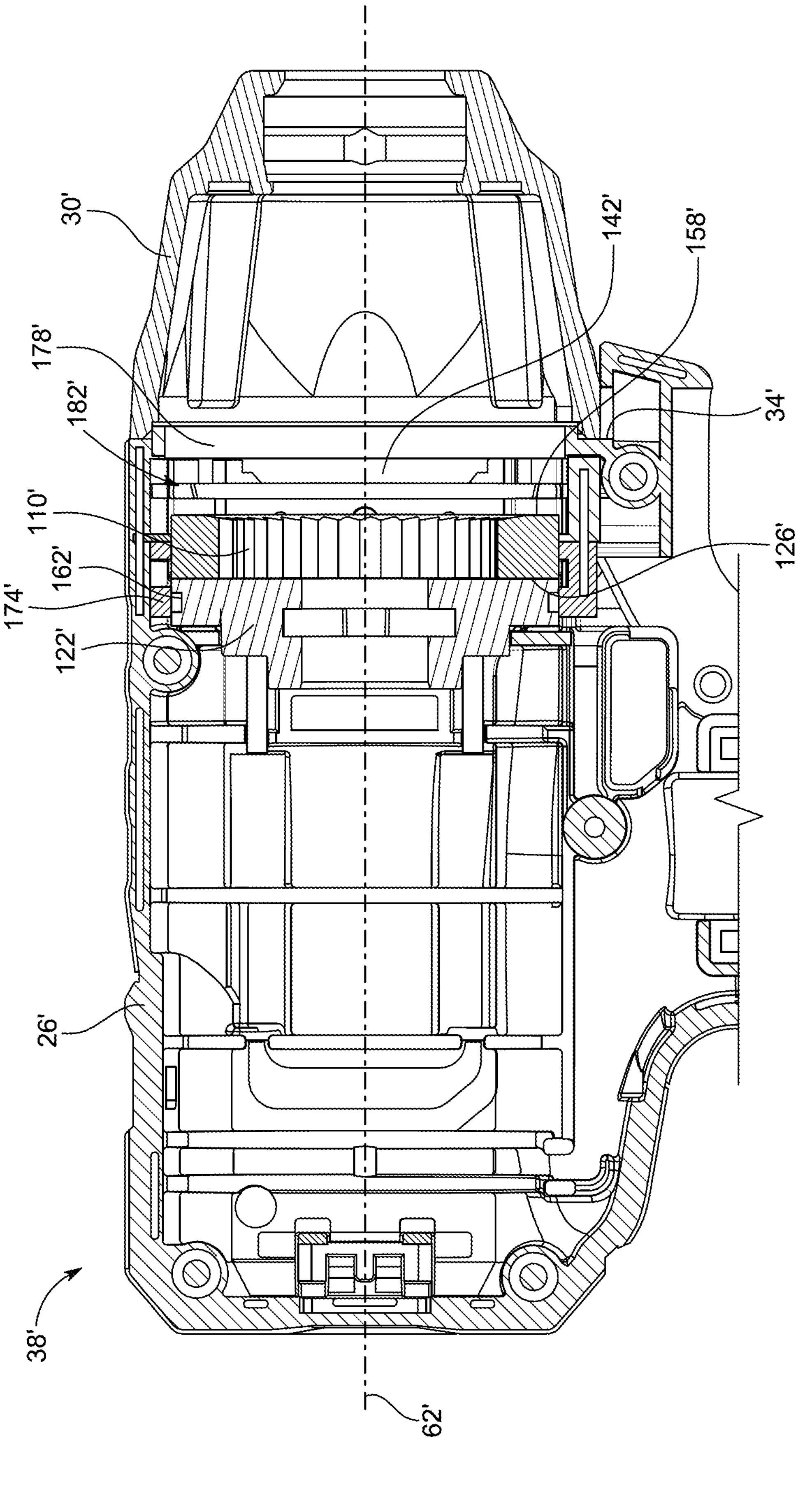
FIG. 10 is partial side view of an impact driver in accordance with another embodiment, illustrating an outer housing and a planetary gear assembly positioned within the outer housing.
Figure 15:
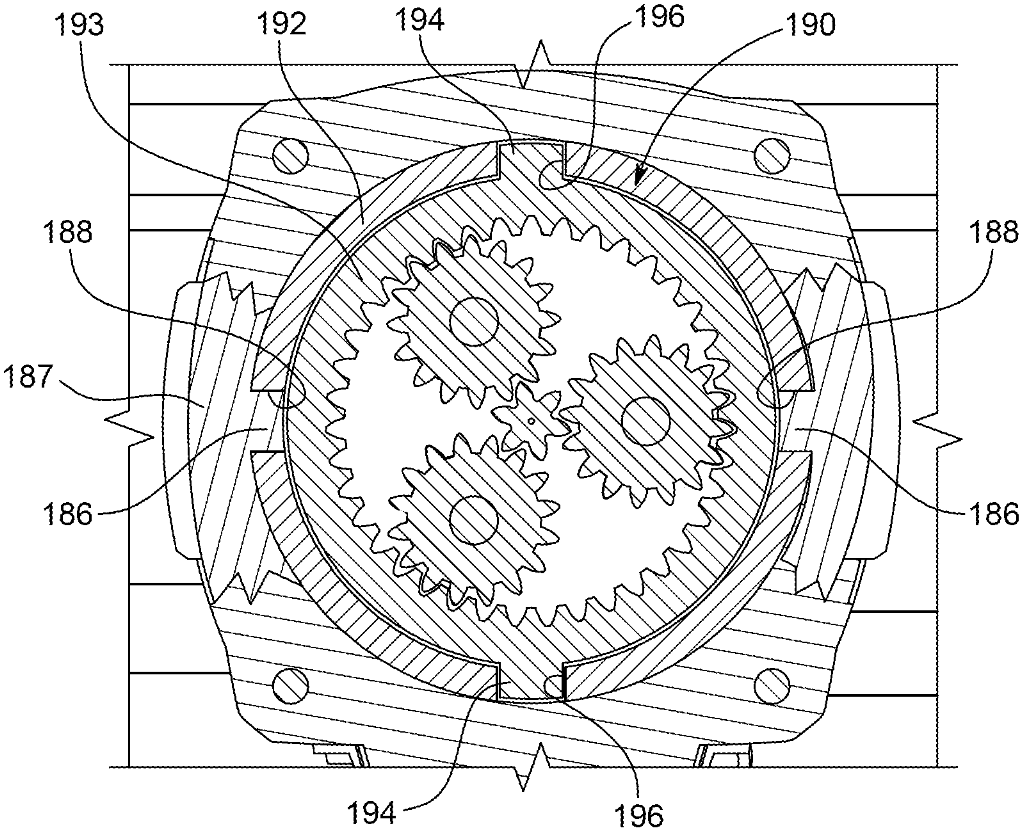
FIG. 15 is a cross-sectional view of an impact driver according to another embodiment of the disclosure.
Figure 16:
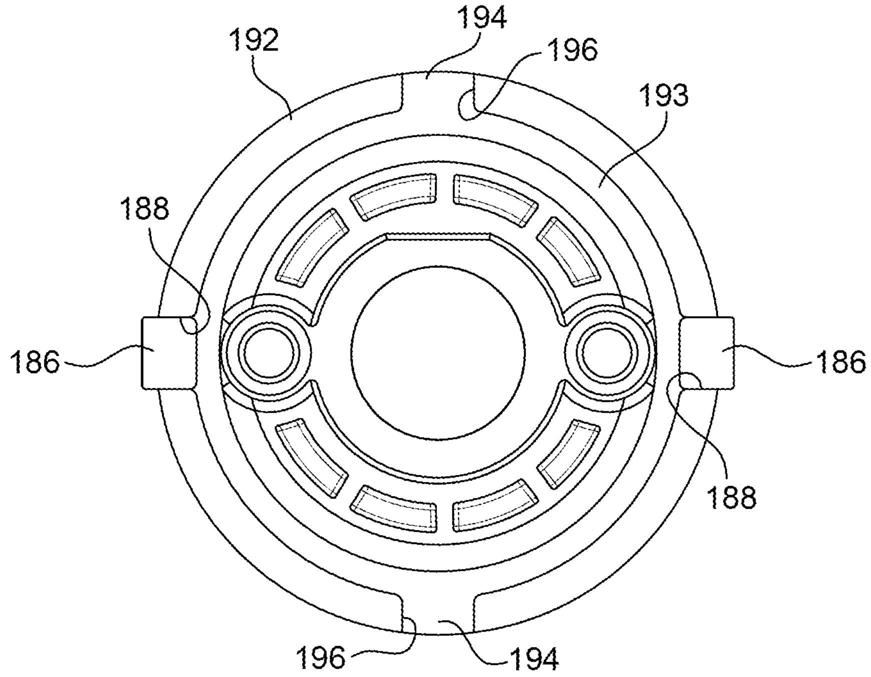
FIG. 16 is a plan view of a gear case supporting a gear assembly according to yet another embodiment of the disclosure.
Figure 17:
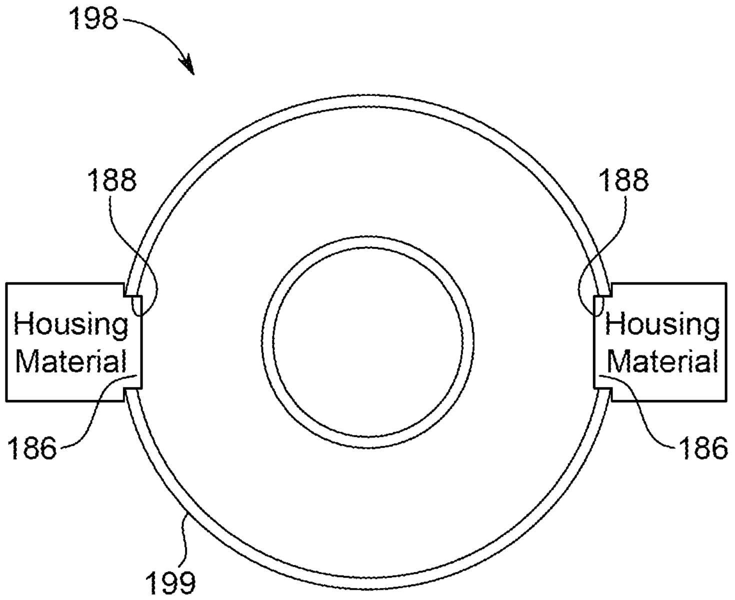
FIG. 17 is a plan view of a bushing of a power tool according to yet still another embodiment of the disclosure.

FIGS. 15-17 illustrate another embodiment of a power tool (e.g., an impact driver such as the impact driver 10, a drill, and/or the like) having internal ribs 186 (e.g., a plurality of ribs 186) that extend from an outer housing 187 and that are received within respective recesses or openings 188 of a non-rotating component of a gear assembly 190 of the power tool. Like the gear assembly 14 described above, the gear assembly 190 may transfer torque from a drive mechanism to an output mechanism in order to rotate the output mechanism about a rotational axis (e.g., the rotational axis 62, 62'; FIGS. 2 and 10). The engagement of the ribs 186 within the openings 188 may fixedly couple the non-rotating component of the gear assembly 190 relative to the outer housing 187. In some cases, the ribs 186 are formed integral with and are the same material (e.g., molded plastic, metal, and/or the like) as the outer housing 187, so that the non-rotating component of the gear assembly 190 is retained directly by and fixed directly to the outer housing 187. In other embodiments, the ribs 186 are not integral with the housing 187.

FIGS. 15 and 16 illustrate a gear case 192 configured to support the gear assembly 190 (FIG. 15) within the outer housing 187. The gear case 192 may be configured as the non-rotating component of the gear assembly 190, and may be fixedly coupled to the outer housing 187. That is, the gear case 192 may include the openings 188, which may receive the ribs 186 of the outer housing 187 to fix the gear case 192 within the outer housing 187.

FIGS. 15 and 16 further illustrate a ring gear 193 of the gear assembly 190, which, in the illustrated embodiment, includes ribs 194 received in secondary apertures or slots 196 of the gear case 192 for rotationally affixing the ring gear 193 to the gear case 192. Stated another way, the openings 188 may be positioned to receive the internal ribs 186 of the outer housing 187 (e.g., formed by first and second housing shells 28A, 28B) to inhibit relative rotation between the outer housing 187 and the gear case 192, and the slots 196 may be positioned to receive the ribs 194 of the ring gear 193 to inhibit relative rotation between the gear case 192 and the ring gear 193 and thus between the ring gear 193 and the outer housing 187. In some embodiments, the outer housing 187 may directly engage and retain the ring gear 193, the gear case 192 being optional.

In some embodiments, the ribs 186 may extend through the openings 188 of the gear case 192 to contact or bear against the ring gear 193. Similarly, in some embodiments, the ribs 194 may extend through the slots 196 of the gear case 192 to contact, bear against, and/or otherwise touch the outer housing 187. In some embodiments, the ribs 186 may extend in a first direction (e.g., a radially inward direction perpendicular to the axis 62, 62') toward the gear case 192 and toward the ring gear 193, and the ribs 194 may extend in a second direction (e.g., a radially outward direction perpendicular to the axis 62, 62') different than (e.g., opposite, differing from, offset from, etc.) the first direction toward the gear case 192 and toward the outer housing 187. Stated another way, the ribs 186 and the ribs 194 may each extend toward and, in some embodiments, through, the gear case 192.

In the illustrated embodiment, the gear case 192 includes two openings 188 and two slots 196. In some embodiments, the gear case 192 may include one of each of the openings 188 and slots 196. In other embodiments, the gear case 192 may include any number of openings and slots, such as more than two (e.g., three or more) openings 188 and more than two (e.g., three or more) slots 196. As illustrated in FIG. 16, four total recesses (e.g., two openings 188 and two slots 196) and four ribs (e.g., two ribs 186 and two ribs 194) are provided. In still other embodiments, openings and slots may be located in the outer housing 187 such that the gear case includes flanges, ribs, stops, etc. that can extend into the openings and slots in the housing 187 to inhibit rotation similar to what has been described herein. In the illustrated embodiment, each of the first and second housing shells 28A, 28B (FIGS. 1 and 2) may include at least one rib 186. More specifically, when connected, the first and second housing shells 28A, 28B may together include two or more ribs 186, such as a first rib and a second rib, that may be positioned to oppose one another (e.g., in opposite directions, on opposite sides of the gear case 192 and/or rotational axis 62, 62', etc.).

As shown in FIG. 17, the non-rotating component may be configured as a bushing 198. The bushing 198 may include the one or more openings 188 defined by an outer circumferential surface 199 of the bushing 198. An internal rib 186 of the outer housing (FIG. 16) is received in the respective opening 188 for rotationally affixing the bushing 198 relative to other components of the gear assembly 190 and/or the outer housing. In some embodiments, the bushing 198 may be received by the first and second housing shells 28A, 28B forwardly and/or rearwardly of the gear case 192 (FIG. 15) such that the ribs 186, which may be integrally formed as a part of the outer housing 26 (FIG. 1) may extend in a longitudinal direction (e.g., parallel to the axis 62, 62') between the gear case 192 (FIG. 15) and the bushing 198 (FIG. 17). As such, the ribs 186 may rotationally fix both the gear case 192 and the bushing 198 within the outer housing 26 in some embodiments. In some embodiments, the outer housing 26 may include two sets of ribs 186, spaced apart by a distance L in the longitudinal direction. The first set of ribs 186 may rotationally fix the gear case 192 within the outer housing 26, and the second set of ribs 186 may rotationally fix the bushing 198 within the outer housing 26. In some embodiments, either the gear case 192 or the bushing 198 are supported in the outer housing 26.

Although the invention has been described in detail with reference to certain preferred embodiments, variations and modifications exist within the scope and spirit of one or more independent aspects of the invention as described. For example, it should be understood that, while not explained in detail for each possible embodiment and/or construction, similar mechanisms/assemblies (e.g., gear, drive, output, etc.), and/or variations/combinations thereof, can be utilized in different embodiments.

Various features of the invention are set forth in the following claims.

What is claimed is:

1. A power tool comprising:
an outer housing;
a drive mechanism positioned within the outer housing;
a gear case positioned within the outer housing;
a gear assembly positioned within the gear case; and
an output mechanism configured to receive torque from the drive mechanism via the gear assembly to rotate about a rotational axis,
wherein the outer housing includes a rib integral with the outer housing and extending from an inner surface of the outer housing,
wherein the rib is received in an aperture of the gear case to prevent the gear case from rotating relative to the outer housing about the rotational axis,
wherein the gear assembly includes a ring gear fixed within the gear case and a plurality of planetary gears meshed with the ring gear,
wherein the rib extends through the aperture towards the ring gear,
wherein the aperture is a first aperture, and
wherein the ring gear includes a rib extending through a second aperture in the gear case.

2. The power tool of claim 1, wherein the rib is one of a plurality of ribs extending from the inner surface of the outer housing, and wherein the aperture is one of a plurality of apertures in the gear case.

3. The power tool of claim 2, wherein each rib of the plurality of ribs is received in a corresponding aperture of the plurality of apertures to rotationally fix the gear case to the outer housing.

4. The power tool of claim 1, wherein the rib and the outer housing are made of a molded plastic.

5. The power tool of claim 1, wherein the rib contacts the ring gear.

6. The power tool of claim 1, wherein the second aperture is offset from the first aperture in a circumferential direction of the ring gear.

7. The power tool of claim 1, wherein the ring gear includes a plurality of ribs extending through a corresponding plurality of second apertures in the gear case.

8. The power tool of claim 1, wherein the outer housing includes a first housing shell and a second housing shell, wherein the rib includes a first portion formed on the first housing shell and a second portion formed on the second housing shell, and wherein the first housing shell and a second housing shell are configured to be connected together, such that the rib is received in the aperture of the gear case.

9. A power tool comprising:

an outer housing including a rib integral with the outer housing and extending from an inner surface of the outer housing;

a drive mechanism positioned within the outer housing;

a gear case positioned within the outer housing;

a gear assembly positioned within the gear case;

an output mechanism configured to receive torque from the drive mechanism via the gear assembly to rotate about a rotational axis;

a bushing rotationally fixed within the outer housing at a position offset relative to the gear case along the rotational axis;

wherein the rib is received in an aperture of the gear case to prevent the gear case from rotating relative to the outer housing about the rotational axis, and wherein the rib extends between the bushing and the gear case in a longitudinal direction parallel to the rotational axis.

10. The power tool of claim 9, wherein the rib engages the bushing to rotationally fix the bushing within the outer housing.

11. The power tool of claim 9, comprising:

wherein the outer housing is formed by connected first and second housing shells and made of a molded plastic.

12. The power tool of claim 11, wherein the outer housing includes a motor housing portion and a handle housing portion extending from the motor housing portion, wherein the drive mechanism includes a motor positioned within the motor housing portion, the motor including a motor shaft, and wherein the power tool further comprises a motor support member configured to rotatably support the motor shaft.

13. The power tool of claim 12, wherein the motor support member is directly supported by the outer housing.

14. The power tool of claim 13, wherein the motor support member abuts a ring gear of the gear assembly.

15. The power tool of claim 11, further comprising a motor support member configured to rotatably support a motor shaft, wherein the motor support member includes a groove configured to receive a sealing member to seal the gear assembly within the outer housing and inhibit lubricant migration.

16. The power tool of claim 11, further comprising:

a motor housing portion;

a motor positioned within the motor housing portion, the motor including a motor shaft; and a motor support member configured to rotatably support the motor shaft, the motor support member including an outer circumferential surface having a groove;

wherein the outer housing includes the motor housing, wherein the groove is configured to receive a sealing member positioned therein, and wherein the sealing member forms a seal configured to prevent lubricant migration between the outer housing and the motor support member.

17. The power tool of claim 16, wherein the outer housing further includes an engagement member protruding from an inner surface thereof, and wherein the sealing member is positioned between the groove and the engagement member.

18. The power tool of claim 11, further comprising a gear assembly retainer including a first portion integrally formed with the first housing shell and a second portion integrally formed with the second housing shell, wherein the gear assembly includes a ring gear having an outer circumferential surface, and wherein the first housing shell and the second housing shell are connected together to directly contact an entire outer circumferential surface of the ring gear.

19. The power tool of claim 16, wherein the output mechanism is at least partially positioned within a front housing, wherein the outer circumferential surface has a first groove, and wherein the sealing member is a first sealing member positionable within the first groove.

20. The power tool of claim 19, further comprising a second groove configured to receive a second sealing member positioned therein and forming the seal configured to prevent lubricant migration between the gear assembly and the front housing, wherein the outer housing includes a first engagement member protruding from an inner surface of the outer housing, and the front housing includes a second engagement member, wherein the first sealing member is positioned circumferentially between the first groove and the first engagement member, and the second sealing member is positioned circumferentially between a second groove and the second engagement member, and wherein the gear assembly is positioned between the first and second engagement members along the rotational axis.

* * * * *